United States Patent Office 3,553,250
Patented Jan. 5, 1971

3,553,250
NOVEL FLUORINATED ACIDS AND
DERIVATIVES THEREOF
Richard F. Sweeney, Dover, and Alson K. Price, Morristown, N.J., assignors to Allied Chemical Corporation, New York, N.Y., a corporation of New York
No Drawing. Filed Aug. 9, 1967, Ser. No. 659,340
Int. Cl. C07c 61/16, 69/74
U.S. Cl. 260—468
19 Claims

ABSTRACT OF THE DISCLOSURE

Novel perfluorocycloalkylidenyl compounds of the formula:

$$\begin{array}{c} F_2C\text{———}C_nF_{2n} \\ | \quad\quad\quad | \\ F_2C\phantom{xx}CF_2 \\ \diagdown\phantom{x}\diagup \\ C \\ \parallel \\ \diagup C\diagdown_{\diagdown O} \\ H\phantom{xxx}C\text{—}X \end{array}$$

wherein $n$ may be 0–2 and may be OH, F, Cl, Oalkyl, Ocycloalkyl, or OM, wherein M is an alkali metal, alkaline earth metal, or —NH$_4$, may be derived from the corresponding (1-hydroxyperfluorocycloalkyl)acetic acids of the formula:

$$\begin{array}{c} F_2C\text{———}C_nF_{2n} \\ | \quad\quad\quad | \\ F_2C\phantom{xx}CF_2 \\ \diagdown\phantom{x}\diagup \\ C \\ \diagup\phantom{xx}\diagdown \\ OH\phantom{xx}CH_2C\text{—}OH \\ \phantom{xxxxxxx}\parallel \\ \phantom{xxxxxxx}O \end{array}$$

Perfluorocycloalkylidenyl compounds of the above formula wherein X is OH may be prepared from the corresponding (1 - hydroxyperfluorocycloalkyl)acetic acids by reacting the latter with concentrated (100%) H$_2$SO$_4$. The resulting acids may be converted into the corresponding acid chlorides, wherein X in the above formula is Cl, by reaction with benzotrichloride or into the corresponding acid fluorides, wherein X in the above formula is F, by reaction with thionyl chloride in the presence of an organic tertiary amine catalyst such as pyridine. The corresponding esters, wherein X in the above formula is Oalkyl or Ocycloalkyl, may be prepared from either of the acid halides by reaction of the latter with an alkanol or cycloalkanol. The esters may also be prepared from perfluorocycloalkanones by a Wittig reaction. Salts of the acids, wherein X in the above formula is OM, may be prepared by reacting the acids with an alkali metal or alkaline earth metal hydroxide or with ammonium hydroxide.

The perfluorocycloalkylidenyl acids and salts thereof are useful surface active agents. Any of the novel compounds wherein X is F, Cl, Oalkyl or Ocycloalkyl can be converted to the corresponding acids or acid salts.

REFERENCE TO RELATED APPLICATION

Co-pending application of Alson K. Price and Richard F. Sweeney, entitled "Novel Fluorinated Acids," Ser. No. 526,023, now Pat. No. 3,427,349, filed Feb. 9, 1966.

BACKGROUND OF THE INVENTION

This invention relates to novel perfluorocycloalkylidenyl compounds and more particularly to novel (perfluorocycloalkylidenyl)acetic acid and corresponding acid halides, acid salts and esters thereof. The (perfluorocycloalkylidenyl)acetic acids are derived from the corresponding (1-hydroxyperfluorocycloalkyl)-acetic acids disclosed in our co-pending application Ser. No. 526,023 mentioned supra. The novel compounds of this invention are useful either as surface active agents or as precursors to useful surface active agents.

The scope of the invention also extends to a novel process for preparing the (perfluorocycloalkylidenyl)-acetyl fluorides of the invention.

SUMMARY OF THE INVENTION

The novel perfluorocycloalkylidenyl compounds of the present invention may be represented by the following formula:

$$\begin{array}{c} F_2C\text{———}C_nF_{2n} \\ | \quad\quad\quad | \\ F_2C\phantom{xx}CF_2 \\ \diagdown\phantom{x}\diagup \\ C \\ \parallel \\ \diagup C\diagdown_{\diagdown O} \\ H\phantom{xxx}C\text{—}X \end{array} \quad \text{I}$$

wherein $n$ may be 0–2 and X may be OH (acids), F (acid fluorides), Cl (acid chlorides), Oalkyl (esters), Ocycloalkyl (esters), or OM (salts) wherein M is an alkali metal, alkaline earth metal or —NH$_4$.

When M is an alkali metal or alkaline earth metal, Na, K, Li, Cs, Rb, Ca, Ba and Mg are preferred.

There is no upper limitation for the carbon content of the alkyl or cycloalkyl groups when X is Oalkyl or Ocycloalkyl. The alkyl chain may be straight chain or branched. The cycloalkyl chain may be alkyl-substituted. The preferred carbon content for the alkyl group is from 1–10 carbon atoms. The preferred carbon content for the unsubstituted cycloalkyl group is 4–6 carbon atoms with the preferred total carbon content for alkyl-substituted cycloalkyl groups being in the range of 5–16 carbon atoms.

Methods for preparing and utilizing the various acids, acid fluorides, and chlorides, esters and salts of the invention, together with a description of specific and preferred embodiments, will be described below under the indicated subheadings.

Preparation of (perfluorocycloalkylidenyl)acetic acids

The novel (perfluorocycloalkylidenyl)acetic acids, i.e. compounds having the above given Formula I wherein X is OH, may be prepared by reacting corresponding (1-hydroxyperfluorocycloalkyl)acetic acids disclosed in co-pending application, Ser. No. 526,023, mentioned supra, i.e. compounds having the formula:

$$\begin{array}{c} F_2C\text{———}C_nF_{2n} \\ | \quad\quad\quad | \\ F_2C\phantom{xx}CF_2 \\ \diagdown\phantom{x}\diagup \\ C \\ \diagup\phantom{xx}\diagdown \\ OH\phantom{xx}CH_2C\text{—}OH \\ \phantom{xxxxxxx}\parallel \\ \phantom{xxxxxxx}O \end{array} \quad \text{II}$$

wherein $n$ may be 0–2, with a strong dehydrating agent such as 100% sulfuric acid.

The dehydration reaction may be carried out by heating a mixture of the reactants at atmospheric pressure until the product unsaturated acid distills off.

Reaction temperatures may vary between about 150–225°. The upper temperature limit for the reaction is governed by the boiling points of the reactants and products.

Elevated pressures may be employed, if desired, but without any significant advantage.

Purification of the product unsaturated acids may be effected by conventional procedures such as fractional distillation or recrystallization from an inert organic solvent such as petroleum ether.

As disclosed more in detail in co-pending application, Ser. No. 526,023, the (1-hydroxyperfluorocycloalkyl)acetic acid starting materials may be prepared by reacting a perfluorocycloalkanone with malonic acid in the presence of a tertiary amine solvent such as pyridine. For best results, reaction temperatures for this reaction, during ketone addition, should be maintained between about 10–25° C. and a closed system or a pressurized system should be employed. After addition of the ketone, the reaction will proceed conveniently at ambient temperatures and above. Recovery of the (1-hydroxyperfluorocycloalkyl) acetic acids may be effected by conventional procedures involving, for example, in one mode, acidifying the reaction mixture and extraction of the desired product with ethyl ether. If desired, the (1-hydroxyperfluorocycloalkyl) acetic acid containing reaction mixture, before or after acidification, may be used as starting material for the above described dehydration reaction without further purification.

Above Formula I encompasses three species of acids, viz (perfluorocyclohexylidenyl)acetic acid, (perfluorocyclopentylidenyl)acetic acid, and (perfluorocyclobutylidenyl)acetic acid.

These acids are colorless, crystalline materials and may be reacted with an inorganic base, such as NaOH, $Ca(OH)_2$ and $NH_4OH$, to form the corresponding acid salts which are useful surface active agents.

EXAMPLE 1

Preparation of (perfluorocyclohexylidenyl)acetic acid

A mixture of 23.5 g. (0.70 mole) of (1-hydroxydecafluorocyclohexyl)acetic acid and 35.2 g. of 100% sulfuric acid was heated until 22 g. of distillate (B.P. 190–205° C.) was collected. The distillate, which solidified upon cooling to ambient temperature, was recrystallized from petroleum ether (B.P. range 65–110° ). A total of 19.9 g. (89% yield) of colorless crystals was obtained. An analytical sample (M.P. 66–67°) was prepared by further recrystallization from petroleum ether. The product was identified as (perfluorocyclohexylidenyl)acetic acid.

*Analysis.*—Calculated for $C_8H_2O_2F_{10}$ (percent): H, 0.63; F, 59.4. Found (percent ): H, 0.65; F, 58.94.

The infrared spectrum of the analytical sample displays bands at 5.77 (shoulder at 5.65) and 5.94 microns, corresponding to the acid and olefinic functions respectfully, thereby confirming the identity of the expected structure.

When the corresponding (1-hydroxyperfluorocycloalkyl)acetic acids containing four and five carbon atoms in the cyclic moiety are employed, corresponding results are obtained.

Preparation of the (perfluorocyclohexylidenyl)acetyl chlorides

The novel (perfluorocycloalkylidenyl)acetyl chlorides represented by Formula I wherein X is Cl, may be prepared by reacting a corresponding (perfluorocycloalkylidenyl)acetic acid with benzotrichloride.

The reaction may be carried out by heating the starting materials at atmospheric pressure, until the desired acid chloride distills off.

Preferred reaction temperatures will generally be in the range of about 50–140° C. at atmospheric pressure, although higher temperatures can be employed.

Elevated pressures may be employed but without any particular advantage.

Purification of the acid chlorides may be effected by conventional procedures including redistillation or gas chromatographic separation.

Above Formula I encompasses three species of acid chloride, viz (perfluorocyclohexylidenyl)acetyl chloride, (perfluorocyclopentylidenyl)acetyl chloride and (perfluorocyclobutylidenyl)acetyl chloride.

These acid chlorides are colorless liquids.

The acid chlorides may be reacted with an inorganic base, such as NoOH, $Ca(OH)_2$ and $NH_4OH$, to form the corresponding acid salts which are useful surface active agents. The reaction of the acid chlorides with base takes place readily at about room temperature. An amount of base should be employed which is sufficient to neutralize all the acid chloride present.

EXAMPLE 2

Preparation of (perfluorocyclohexylidenyl)acetyl chloride

A mixture of 37.0 g. (0.12 mole) of (perfluorocyclohexylidenyl)acetic acid and 35.2 g. (0.18 mole) of benzotrichloride was mixed and heated in a spinning band distillation apparatus until a distillate (B.P. 130–140° C.) was collected. Redistillation of the distillate gave 33.6 g. of a colorless liquid (B.P. 141–142° C.). Gas liquid partition chromatography showed this material to be 96% pure. A yield of 78% was obtained. An analytical sample was prepared by gas liquid partition chromatographic separation. The product was identified as (perfluorocyclohexylidenyl)acetyl chloride.

*Analysis.*—Calculated for $C_8HClOF_{10}$ (percent): C, 28.4; H, 0.3; Cl, 10.5. Found (percent): C, 26,4; H, 0.26; Cl, 10.4.

The infrared spectrum of the analytical sample displayed bands at 5.52 and 5.93 microns, corresponding to the acid chloride (C=O) and olefinic functions respectfully, thereby confirming the identity of the expected structure.

A sample of the acid chloride hydrolyzed, upon standing in an open vessel, to the parent acid as identified by comparison of its melting point with that of an authentic sample of the parent acid.

Corresponding results are obtained when corresponding (perfluorocycloalkylidenyl)acetic acids containing four and five carbon atoms in the cyclic moiety are employed as starting materials.

Preparation of (perfluorocycloalkylidenyl)acetyl fluorides

Novel (perfluorocycloalkylidenyl)acetyl fluorides, represented by above Formula I wherein X is F, may be prepared by reacting a corresponding (perfluorocycloalkylidenyl)acetic acid with thionyl chloride in the presence of an organic tertiary amine catalyst, such as pyridine, triethylamine, quinoline and quinuclidine, and recovering the acid fluoride product from the reaction mixture. Any of the well known class of tertiary amines may be employed.

The reaction may be carried out by heating the reactants at atmospheric pressure until the desired acid fluoride distills off. The preferred way of running the reaction is to mix the reactants and bring the reaction temperature slowly up to reflux temperature. Generally, reaction will take place between about 50–120° C. The upper limitation for reaction temperature is governed by the boiling point of the sought-for product.

Sub- or superatmospheric pressures may be used if desired. For example, the reaction mixture may be heated at atmospheric pressure until the product distills off, or the reaction mixture may be heated to about 80° C. following which the pressure may be reduced to the point at which distillation of the product will take place at 80° C.

Only a trace or catalytic amount of the tertiary amine is necessary in the reaction and the optimum quantity to employ may be readily ascertained by routine experimentation. Generally, quantities in the range of about .1–2% by weight tertiary amine based upon the amount of acid present are suitable with weight percentages closer to about .5% being preferred.

For most efficient results, an excess of thionyl chloride should be employed, although the reaction will proceed satisfactorily when stoichiometric quantities of the reactants are employed.

Purification of the reaction mixture may be achieved by conventional procedures such as redistillation or gas chromatographic separation.

There are three species of acid fluorides covered by Formula I, viz. (perfluorocyclohexylidenyl)acetyl fluoride, (perfluorocyclopentylidenyl)acetyl fluoride, and (perfluorocyclobutylidenyl)acetyl fluoride.

These acid fluorides are colorless liquids. They may be reacted with an inorganic base, such as NaOH, Ca(OH)$_2$ and NH$_4$OH, to form the corresponding acid salts which are useful surface active agents. The reaction of the acid fluorides with base takes place readily at about room temperatures. An amount of base should be employed which is sufficient to neutralize all the acid fluoride present.

EXAMPLE 4

Preparation of (perfluorocyclohexylidenyl)acetyl fluoride

A mixture of 5.0 g. (0.016 mole) of (perfluorocyclohexylidenyl)acetic acid, 2.38 g. (0.02 mole) of thionyl chloride and one drop of pyridine was mixed and the temperature of the reaction mixture was slowly raised to about 80° C. The reaction mixture was maintained at about 80° C. for about thirty minutes, after which period the temperature was increased until 2.7 g. of a colorless liquid (B.P. 120° C.) were distilled from the mixture. Gas liquid partition chromatography and infrared analysis indicated that 93% of this distillate constituted (perfluorocyclohexylidenyl)acetyl fluoride. A yield of 47% was obtained. An analytical sample obtained by gas liquid paratition chromatographic separation showed the following:

Calculated for $C_8HOF_{11}$ (percent): C, 29.8; H, 0.31. Found (percent): C, 29.8; H, 0.35.

The infrared spectrum displays bands at 5.39 and 5.95 microns, corresponding to the C=O (acid fluoride) and olefinic functions respectively.

Upon standing in an open vessel, a sample of the acid fluoride hydrolyzed to the corresponding acid as identified by comparison of its melting point and infrared spectrum with those of an authentic sample.

Treatment of a sample of the acid fluoride with warm ethanol converted it to the corresponding ethyl ester as identified by comparison of its infrared spectrum with that of an authentic sample of the ester.

Corresponding results are obtained when corresponding (perfluorocycloalkylidenyl)acetic acids containing four and five carbon atoms in the cyclic moiety are employed as starting materials.

Preparation of alkyl(perfluorocycloalkylidenyl)acetates

Novel alkyl(perfluorocycloalkylidenyl)acetates, represented by above Formula I wherein X is Oalkyl or Ocycloalkyl, may be prepared by reacting a corresponding unsaturated acid halide as above described with a suitable alkanol, at moderately elevated temperatures. An illustravtive reaction of this type was carried out as reported in Example 4.

The ester product may be separated from the reaction mixture by diluting the reaction mixture with cold water followed by physical separation of the organic product layer. After washing with cold water, the ester product may be dried with a conventional drying agent, such as sodium sulfate. Further purification may be achieved by gas chromatographic separation or by distillation.

The novel alkyl(perfluorocycloalkylidenyl)acetates may be also prepared by heating a corresponding perfluorocycloalkanone having 4–6 carbon atoms with a carbalkoxymethylene triphenylphosphorane in an inert organic solvent, such as ethyl ether. The use of superatmospheric pressure for this reaction is preferred since it aids in preventing loss of the volatile perfluorocycloalkanone starting materials. The perfluorocycloalkanones and carbalkoxymethylene triphenylphosphorane reagents are known classes of materials. Perfluorocycloalkanones and their preparation are disclosed in U.S. Pat. 3,039,995 and British Pat. 1,019,788. Preparation of carbalkoxymethylene triphenylphosphorane type reagents is discussed in J. Org. Chem., vol. 27 (1962), p. 998.

Purification of the ester product from this reaction may be effected by filtering off the by-product triphenylphosphine oxide, followed by removal of the solvent by distillation. Final purification may be effected by cold water washing as described above for the alkanol route.

Illustrative esters which come within the scope of the invention include the following:

methyl(perfluorocyclobutylidenyl)acetate
ethyl(perfluorocyclohexylidenyl)acetate
n-propyl(perfluorocyclopentylidenyl)acetate
n-butyl(perfluorocyclobutylidenyl)acetate
isopropyl(perfluorocyclopentylidenyl)acetate
n-hexyl(perfluorocyclopentylidenyl)acetate
n-octyl(perfluorocyclopentylidenyl)acetate
n-decyl(perfluorocyclopentylidenyl)acetate
cyclohexyl(perfluorocyclohexylidenyl)acetate
2-ethylcyclopentyl(perfluorocyclobutyl)acetate The novel alkyl(perfluorocycloalkylidenyl)acetates may be converted directly to the corresponding acid salts by mild to moderate heating of a mixture of the esters with dilute aqueous inorganic base, such as NaOH. Reaction temperatures are desirably maintained in the range of about 25–75° C. Concentration of the base should be maintained in the range of about .1–10% by weight and still preferably in the range of about .5–5% by weight.

The novel alkyl(perfluorocycloalkylidenyl)acetates may be converted to the corresponding acid fluorides by reaction with sulfur tetrafluoride at temperatures from about 100–300° C. in the presence of a Lewis acid catalyst such as BF$_3$.

The novel alkyl(perfluorocycloalkylidenyl)acetates may also be converted to the corresponding acid chlorides by heating with PCl$_5$. Temperatures of about 100° C. are required to maintain this reaction. If desired, a catalyst such as platinum or palladium black may be employed.

EXAMPLE 3

Preparation of ethyl(perfluorocyclohexylidenyl)acetate

A mixture of 10 g. (0.036 mole) of perfluorocyclohexanone, 5.2 g. (0.015 mole) of carbethoxymethylene triphenylphosphorane and 10 ml. of ethyl ether was placed in an aerosol compatibility tube and heated for three hours at 70–80° C. At the end of this period the reaction mixture was permitted to cool to ambient temperature and was filtered to remove 3.2 g. of the by-product, triphenylphosphine oxide. The ethyl ether was then distilled from the filtrate to leave a liquid residue. The liquid residue was purified by gas liquid partition chromatography to provide 3.0 g. (57% yield) of a water-white liquid. The product was identified as ethyl(perfluorocyclohexylidenyl) acetate.

Analysis.—Calculated for $C_{10}H_6O_2F_{10}$ (percent): C, 34.5; H, 1.7; F, 54.6. Found (percent): C, 34.4; H, 1.62; F, 54.6.

The infrared spectrum exhibited absorption bands at 5.72 and 5.95, corresponding to the ester and olefinic functions respectively, thereby confirming the identity of the expected structure. Corresponding results are obtained when reagents containing four and five carbon atoms in the cyclic ring are employed.

Preparation of (perfluorocycloalkylidenyl)acetate salts

The novel (perfluorocycloalkylidenyl)acetate salts represented by Formula I, wherein X is OM, may be prepared by mixing the novel unsaturated acid halides or esters with a base as described above or by mixing a parent unsaturated acid with a similar base. A stoichiometric amount of the aqueous inorganic base should be employed. The inorganic base should be used in aqueous solution. 0.1 N aqueous NaOH is suitable, for example. The reaction takes place readily at room temperature. The solid salt product may be readily isolated from the reaction mixture solution by evaporation of the solution to dryness on a steam bath.

Illustrative species of (perfluorocycloalkylidenyl)acetate salts within the scope of the invention are as follows:

sodium (perfluorocyclobutylidenyl)acetate
calcium (perfluorocyclobutylidenyl)acetate
potassium (perfluorocyclopentylidenyl)acetate
magnesium (perfluorocyclohexylidenyl)acetate
lithium (perfluorocyclohexylidenyl)acetate
cesium (perfluorocyclopentylidenyl)acetate
rubidium (perfluorocyclohexylidenyl)acetate
ammonium (perfluorocyclobutylidenyl)acetate

EXAMPLE 5

Preparation of sodium (perfluorocyclohexylidenyl)acetate

One gram (.0031 mole) of (perfluorocyclohexylidenyl) acetic acid was dissolved in 31 ml. of 0.1 N aqueous sodium hydroxide. The resulting solution was then evaporated to dryness on a steam bath to give 0.96 g. (91%) of sodium (perfluorocyclohexylidenyl)acetate.

Corresponding salts are prepared when other unsaturated acids within the scope of the invention are employed as starting materials.

All yields in the above examples were computed by dividing the moles of desired product formed by the moles of starting material reacted. Parts and percentages are by weight unless otherwise indicated.

The novel acids and acid salts of the invention exhibit surface activity and may be used as anti-wetting agents and as emulsifying agents in conventional manner.

The following table shows the surface tensions of sodium (perfluorocyclohexylidenyl)acetate in various concentrations in water. Surface tensions were measured with a Dunouy Tensiometer at about 25° C. These are to be compared with the surface tension of water at 25° C. which is 72 (dynes/cm.).

| Concentration, percent: | Surface tension (dynes/cm.) |
|---|---|
| 1.0 | 26.4 |
| 0.5 | 31.1 |
| 0.1 | 45.7 |

Aqueous solutions of other salts within the scope of the invention similarly exhibit surface tensions which are lower than water alone.

We claim:
1. Compounds of the formula:

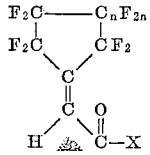

wherein $n$ may be 0–2 and X may be OH, F, Cl, Oalkyl, Ocycloalkyl, or OM wherein M is an alkali metal, alkaline earth metal or —$NH_4$.
2. Compounds according to claim 1 wherein X is OH.
3. Compounds according to claim 1 wherein X is Cl.
4. Compounds according to claim 1 wherein X is F.
5. Compounds according to claim 1 wherein X is Oalkyl.
6. Compounds according to claim 1 wherein X is Ocycloalkyl.
7. Compounds according to claim 1 wherein X is OM.
8. Compounds according to claim 1 wherein X is ONa.
9. Compounds according to claim 1 wherein $n$ is 0.
10. Compounds according to claim 1 wherein $n$ is 1.
11. Compounds according to claim 1 wherein $n$ is 2.
12. A compound according to claim 1 which is (perfluorocyclohexylidenyl)acetyl fluoride.
13. A compound according to claim 1 which is (perfluorocyclohexylidenyl)acetic acid.
14. A compound according to claim 1 which is (perfluorocyclohexylidenyl)acetyl chloride.
15. A compound according to claim 1 which is ethyl (perfluorocyclohexylidenyl)acetate.
16. A compound according to claim 1 which is sodium (perfluorocyclohexylidenyl)acetate.
17. The process of preparing an acid fluoride as described by the formula in claim 1, wherein X is F, which comprises reacting a corresponding compound as described in claim 1 wherein X is OH with thionyl chloride in the presence of an organic tertiary amine catalyst, and recovering the acid fluoride product from the reaction mixture.
18. The process according to claim 17 in which $n$ is 2.
19. The process according to claim 17 in which $n$ is 1.

References Cited

UNITED STATES PATENTS 2,961,429  11/1960  Anderson _____ 260—63

FOREIGN PATENTS 908,177  10/1962  Great Britain ____ 2(3)—CO7c

OTHER REFERENCES

Synthetic Organic Chemicals, vol. III, No. 4, pp. 1 and 2.

LORRAINE A. WEINBERGER, Primary Examiner
R. GERSTL, Assistant Examiner

U.S. Cl. X.R.
260—514, 544